United States Patent
Park (10) Patent No.: US 7,717,399 B2
(45) Date of Patent: May 18, 2010

(54) SIDE INLET-TYPED SOLENOID VALVE

(75) Inventor: Jong Won Park, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 534 days.

(21) Appl. No.: 11/775,637

(22) Filed: Jul. 10, 2007

(65) Prior Publication Data

US 2008/0272321 A1 Nov. 6, 2008

(30) Foreign Application Priority Data

May 2, 2007 (KR) .................. 10-2007-0042464

(51) Int. Cl.
*F16K 31/02* (2006.01)
(52) U.S. Cl. ................. 251/129.15; 303/119.2
(58) Field of Classification Search ............ 251/129.15; 303/119.2
See application file for complete search history.

(56) References Cited

U.S. PATENT DOCUMENTS

| | | | | |
|---|---|---|---|---|
| 5,488,973 A | * | 2/1996 | Yamamuro | ............... 303/119.2 |
| 5,681,098 A | * | 10/1997 | Ganzel et al. | .......... 251/129.15 |
| 5,683,151 A | * | 11/1997 | Friedow et al. | .......... 303/119.2 |
| 6,364,430 B1 | * | 4/2002 | Park | ................. 303/119.2 |
| 6,431,208 B1 | * | 8/2002 | Fulks | ................. 303/119.2 |
| 6,588,857 B2 | * | 7/2003 | Sim | ............... 251/129.15 |
| 6,659,421 B1 | * | 12/2003 | Goossens | ............... 251/129.02 |
| 2003/0183790 A1 | | 10/2003 | Ji et al. | |
| 2003/0201418 A1 | | 10/2003 | Ahn | |
| 2004/0011981 A1 | | 1/2004 | Ahn | |

* cited by examiner

*Primary Examiner*—John Bastianelli
(74) *Attorney, Agent, or Firm*—Greenblum & Bernstein, P.L.L.C.

(57) ABSTRACT

A solenoid valve for a slip control system in a vehicle is disclosed. A flow passage is provided in which working fluid such as oil that generates a break hydraulic pressure flows from the side of a solenoid valve through a filter, flows to the front of a plunger through a side hole formed in a valve body of the solenoid valve, and then flows along the side of valve body, that is, is discharged out of an outlet through a side space between valve body and a valve seat. Therefore, linear pressure control is easy because working fluid flows into toward the front of valve plunger through a side inlet of solenoid valve and the entire size is reduced because a special channel for guiding working fluid to the front of the valve plunger is not needed in a pump housing case.

14 Claims, 6 Drawing Sheets

OIL FLOW PASSAGE: d → e → f → g

TO MASTER CYLINDER

FIG.6

SIDE INLET-TYPED SOLENOID VALVE

CROSS-REFERENCE TO RELATED APPLICATIONS

The present application is based on, and claims priority from, Korean Application Serial Number 10-2007-0042464, filed on May 2, 2007, the disclosure of which is hereby incorporated by reference herein in its entirety.

FIELD OF THE INVENTION

The present invention relates to a solenoid valve, and in particularly to a side inlet-typed solenoid valve that is capable of reducing the overall size by using a side inlet that is basically formed in the valve to allow working fluid to flow to the front of the plunger for linear pressure control without additionally forming a specific channel in the pump housing block.

BACKGROUND OF THE INVENTION

In general, in a brake system for a vehicle, a hydraulic pressure that is a braking pressure is transferred to the wheel brakes by operating the brake pedal to decelerate or stop the vehicle. However, because the brake system is actuated to stop a traveling vehicle by force, which causes the vehicle to skid forward depending on the road condition or braking pressure.

A brake system that electronically controls the braking pressure for the wheel brakes is widely used in vehicles to prevent the slip, and, for example, an ABS (Anti-Lock Brake System), a TCS (Traction Control System) that prevents excessive slip of the driving wheels due to sudden start or sudden acceleration, or an ESP (Electronic Stability Program) system that safely maintains the direction of a vehicle travel intended by the driver under any driving conditions by minimizing the difference of the actual direction from the direction of a vehicle travel intended by the driver.

These electronic control brake systems are provided with a solenoid valve to control hydraulic pressure in the brake wheel cylinders. The solenoid valve was controlled by an on-off control method in the related art, but, recently, is controlled by pulse width modulation (referred to as PWM hereafter) to appropriately adapt to various conditions.

For example, as for an ABS/ESP, when a normal open-typed solenoid valve is operated, a control unit (commonly called ASB/ESP HU (Hydraulic Unit)) adjusts a preset duty ratio of PWM signals and actuates the normal open-typed solenoid valve to control the pressure of the brake wheel cylinders.

The solenoid valve that is installed in the oil pump housing block blocks the flow passage when working fluid flows from the master cylinder to the wheel cylinder and opens the flow passage when working fluid flows from the wheel cylinder to the master cylinder. Therefore, the channel formed in the pump housing block allows oil to flow through an involved pump and accumulator as well as the solenoid valve.

Accordingly, the solenoid valve is installed such that the inlet/outlet of the solenoid valve is aligned with the inlet/outlet of the channel formed in the pump housing block.

Further, because a linear pressure should be controlled in order to control PWM of the solenoid valve, it is preferable for oil to flow into the solenoid valve toward the front of the plunger.

In general, however, a channel that is formed in a pump housing block including a solenoid valve is formed such that oil flows into the solenoid valve from the side. Accordingly, since the oil flows into the solenoid valve from other directions and not from the front of the plunger, it is difficult to control the PWM as well as the linear pressure.

Further, in order to overcome the above problems, when a channel is formed in the pump housing block to guide oil to the front of the plunger in the solenoid valve, that is, when the inlet and the outlet of the channel are switched from each other in the pump housing block, the manufacturing cost increases. Furthermore, due to the change of the inlet port and outlet port of the channel, the entire size of the pump housing block increases, instead of reducing the size.

SUMMARY OF THE INVENTION

An embodiment of the present invention provides a solenoid valve in which oil is directed to the front of a plunger in an inside channel of the solenoid value assembled by a pump housing block of an oil pump to allow easy control of a linear pressure and accurate control of PWM (Pulse Width Modulation).

Further, according to an embodiment of the invention, a working fluid flows toward the front of the plunger by switching the channel in the solenoid valve and thus an additional process for switching the inlet/outlet of the passage in the pump housing block including the solenoid valve is not required. Therefore, the entire size and weight can be reduced.

An embodiment of the invention provides a side inlet-typed solenoid valve including a plunger, a valve body, a valve seat, a passage changing channel, an orifice, and a filter. The plunger is elastically supported by a coil spring and a stator that is magnetized by a coil electromagnetic field caused by a current applied. The plunger is magnetized together with the stator and reciprocates to open/close an inside channel. The valve body is connected to the stator through a sleeve and inserted in a valve insert hole communicating with an inlet port and an outlet port of a pump housing case such that a flow passage is formed between the inlet port and the outlet port by the plunger that reciprocates therein. The valve seat opens/closes the inside channel depending on the contact state with a check ball provided at the end of the plunger inserted in the valve body. The passage-switching channel is formed in the valve body so that oil flowing from the inlet outlet of the pump housing case into the side of the valve body flows along the side of the valve body, and then flows toward the front of the plunger inserted in a body forming channel. Thereafter, the oil is discharged through the outlet formed in the axial direction of the valve body. The orifice is formed toward the valve seat and fixed in the valve body through a cover to change the direction of oil that flows in the valve body through the passage changing channel into an axial direction that is the front of the plunger. The filter filters impurities contained in the oil flowing into, at the inlet of the pump housing case.

The valve body has an extending connecting end, a pump connecting end, a channel forming channel, and a body forming channel. The extending connecting end is positioned outside the valve insert hole at the rear side of a pump connecting end with a large diameter that is inserted in the valve insert hole of the pump housing case. The plunger with the check ball is inserted to the extending connecting end. The channel forming end forms a channel forming end providing an oil storage space for the valve insert hole, at the front side of the pump connecting end. The body forming channel is axially formed to insert the valve seat and the plunger in the valve body from the left and right, respectively, with the check ball therebetween. The passage changing channel is communicated with the body forming channel at the channel forming end and changes the direction of the oil having flowed in the valve body to the front of the plunger.

The valve seat has a seat body and a body forming channel. The seat body forms a predetermined gap in the valve body at the portion that is not in contact with the inside of the valve body and provides the passage changing channel that allows the oil having flowed in toward the front of the plunger in the valve body to reverse and flow out of the valve body. The body forming channel through which the oil flows is formed axially through the seat body and is opened/closed by the check ball.

The diameter of the seat body is constant throughout the entire body with a flow passage for working fluid that is provided by axially forming a groove of a predetermined length on the outside of the seat body, separated from the body forming channel.

The passage changing channel includes axial inflow channels, a circumferential communicating channel, a body forming channel, an axial reverse channel, a circumferential communicating channel, and axial discharge channels. The axial inflow channels are formed on a circumferential surface of the end of the valve body positioned at the end of the valve insert hole of the pump housing case. The circumferential communicating channel is circumferentially formed inside the valve body perpendicularly connected to the end of the axial inflow channel. The body forming channel of the valve seat guides the oil having passed through the circumferential communicating channel to the front of the plunger. The axial reverse channel is a predetermined gap formed between the outside of the valve seat and the inside of the valve body with the valve body inserted. The circumferential communicating channel is formed through around the valve body and perpendicular to the end of the axial reverse channel. The axial discharge channels are formed around the outside of the end of the valve body at the connecting portion of the circumferential communicating channel and positioned at a predetermined distance from the axial inflow channel.

The orifice and the valve seat are sequentially positioned in the valve body at the end with the axial inflow channels and the axial discharge channels.

The axial inflow channels are positioned at predetermined intervals on the inside from the end within the end of the valve body and the axial discharge channels are formed to the end of the valve body. The axial inflow channel and the axial discharge channel are grooves axially formed around the outside of the end of the valve body. The axial inflow channel and the axial discharge channel are formed at 90° from each other at a plurality of positions.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Figure 1:
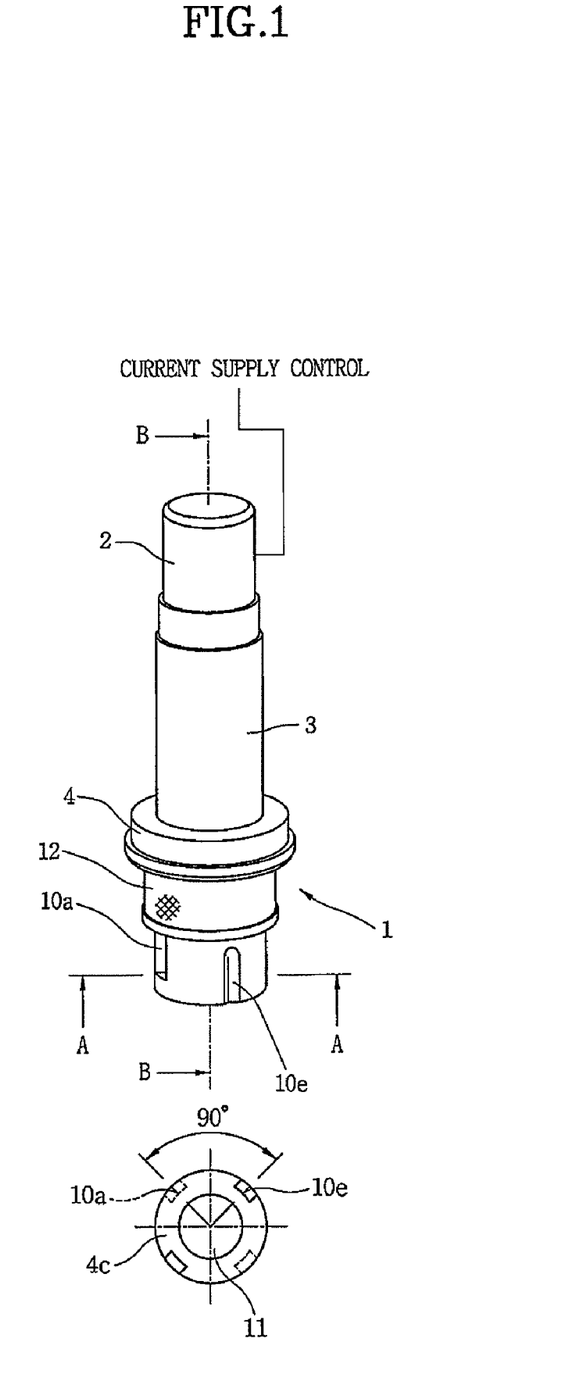
FIG. 1 is a perspective view of a side inlet-typed solenoid valve according to the invention.
Figure 2:
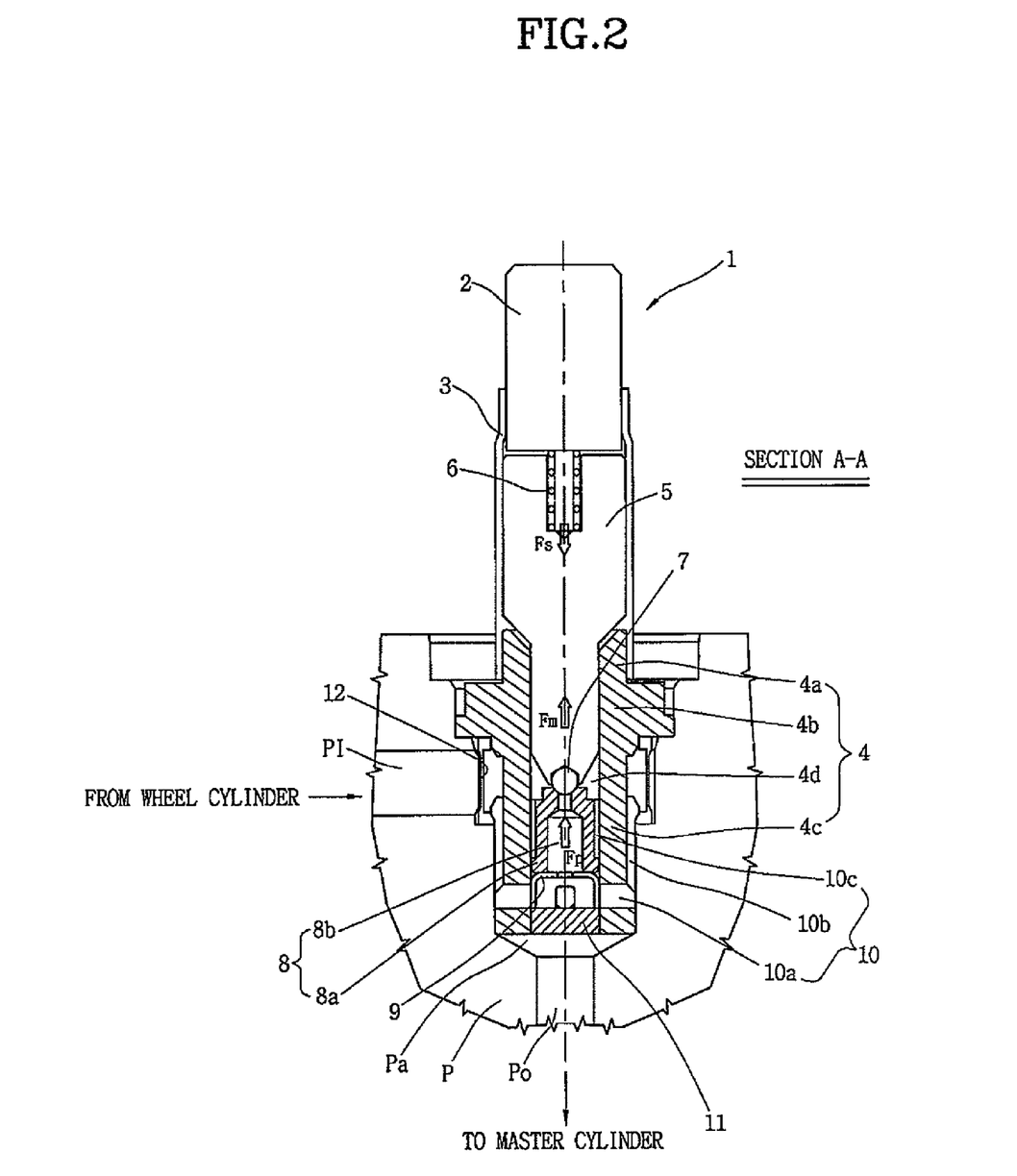
FIG. 2 is a cross-sectional view taken along a line A-A of FIG. 1.
Figure 3:
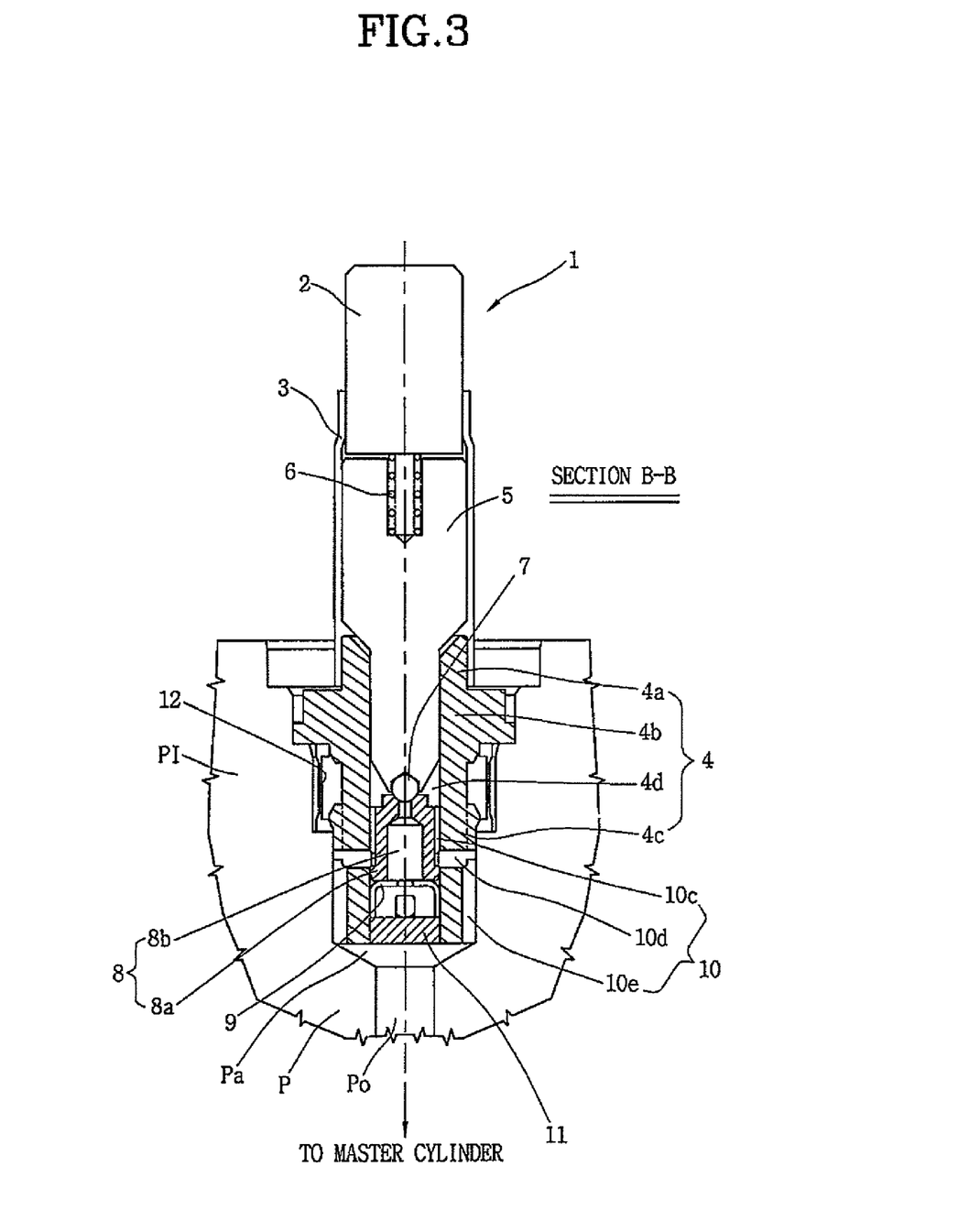
FIG. 3 is a cross-sectional view taken along a line B-B of FIG. 2.

Referring to FIGS. 1, 2 and 3, a solenoid valve 1 according to the embodiment of the invention includes a plunger 5 that is elastically supported by a coil spring 6 and magnetized together with a stator 2 that is magnetized by a coil electromagnetic field generated by current controlled by a controller and reciprocates to open/close an inside channel, a valve body 4 that provides a flow passage for the inlet port/outlet port in a pump housing case P by opening/closing of plunger 5 inserted, a valve seat 8 that is inserted in the channel of valve body 4 and forms a channel depending on a contact state of a check ball 7 provided at the end of plunger 5, and a passage changing channel 10 that is formed in valve body 4 to form a flow passage in which oil flows along the side of valve body 4 and flows toward the front of the plunger 5 inserted in a body forming channel 4d of valve body 4 and then is discharged out of valve body 4 in a reverse direction to the inflow direction.

A valve insert hole Pa in which solenoid valve 1 is fitted is formed in pump housing case P, an inlet port PI through which oil flows into from wheel cylinder WC is connected to the side of valve insert hole Pa, and an outlet port PO has an end that is connected to master cylinder M so as to coaxially communicate with insert hole Pa.

Further, valve body 4, plunger 5, and stator 2 fitted in pump housing case P are coupled by a sleeve 3 that encloses and fix them.

An orifice 9 is further provided in passage changing channel 10 to change the flow direction of the working fluid into the axial direction of valve body 4.

Orifice 9 has a hole that allows the working fluid to flow in an axial direction and a side hole that allows the working fluid to effectively flow into through passage changing channel 10.

A cover 11 is provided at the end of valve body 4 where passage changing channel 10 is formed, to close a hole that is bored to form the passage changing channel 10, and is fitted in the hole formed at the end of valve body 4.

Cover 11 pushes inserted orifice 9 against the end of body forming channel 4d in valve body 4 and prevents leakage of the working fluid out of valve body 4.

A filter 12 surrounds the portion of valve body 4 that is inserted in valve insert hole Pa of pump housing case P. Filter 12 is formed of a metallic mesh and filters impurities flowing in through inlet port PI of pump housing case P from the side of valve body 4.

Valve body 4, as shown in FIGS. 2 and 3 that are the cross-sectional views taken along lines A-A and B-B of FIG. 1, has an extending connecting end 4a positioned outside valve insert hole Pa and to which plunger 5 with check ball 7 is inserted, at the rear side of a pump connecting end 4b having a large diameter that is inserted in valve insert hole Pa on pump housing case P, and a channel forming end 4c positioned at valve insert hole Pa in which valve seat 8 is inserted, at the front side of pump connecting end 4b.

A body forming channel 4d is axially formed through valve body 4 and in which valve seat 8 and plunger 5 are inserted from the left and right of body forming channel 4d, respectively, with check ball 7 therebetween.

As shown in the cross-sectional views taken along lines A-A and B-B of FIG. 1, valve seat 8 that is inserted in body forming channel 4d of valve body 4 opposite to plunger 5 has a seat body 8a having a predetermined diameter whose one end is closely fitted in body forming channel 4d. Seat body 8a further has a stepped diametric portion that a predetermined gap is defined between body forming channel 4d and the portion of seat body 8a except for a diametric portion that is closely fitted in body forming channel 4d.

A gap is formed between the stepped portion of seat body 8a and body forming channel 4d is so that the diameter of entire seat body 8a becomes small, or is equal to the diameter of body forming channel 4d. Further, a plurality of grooves are formed in an axial direction on the circumferential surface of seat body 8a to form a predetermined gap in which the working fluid can flow through body forming channel 4d.

A body forming channel 8b through which oil flows is formed through valve seat 8 and provides a discharge passage for working fluid that has passed through orifice 9 to body forming channel 4d in valve body 4.

The working fluid that has flowed in body forming channel 4d in valve body 4 returns through the gap between seat body 8a and body forming channel 4d in a reverse direction, and thus a flow passage is configured such that the working fluid sequentially flows into valve body 4 and valve insert hole Pa connected with solenoid valve 1 from inlet port PI of pump housing case P and then returns to master cylinder M through outlet port PO.

Orifice 9 is disposed at a seat body 8a side of valve seat 8 and check ball 7 of plunger 5 comes in contact with a side opposite to seat body 8a.

Passage changing channel 10 includes an inflow passage that allows working fluid to flow into plunger 5 inserted in valve body 4 through inlet port PI of the pump housing case P and a discharge passage that allows the working fluid to be discharged from valve body 4 to the master cylinder through outlet port PO of pump housing case P.

As shown in FIGS. 1 and 2, the inflow passage includes an axial inflow channel 10a that is formed around the outside in a region corresponding to channel forming end 4c of valve body 4 inserted in valve insert hole Pa of pump housing case P, a circumferential communicating channel 10b that is circumferentially formed inside valve body 4 perpendicularly to the end of axial inflow channel 10a, and body forming channel 8b of valve seat 8 that guides the working fluid having passed through orifice 9 through circumferential communicating channel 10b to the front of plunger 5.

On the other hand, as shown in FIGS. 1 and 3, the discharge passage includes an axial reverse channel 10c that is the gap between stepped seat body 8a of valve seat 8 and body forming channel 4d of valve body 4, a circumferential communicating channel 10d circumferentially formed inside valve body 4 perpendicularly to the end of axial reverse channel 10c, and axial discharge channels 10e that is formed from a portion connected with circumferential communicating channel 10d to the end of channel forming end 4c of valve body 4, at predetermined intervals from axial inflow channel 10a serving as the inlet for working fluid so as to allow the working fluid flowing in body forming channel 4d of valve body 4 to reversely flow.

Axial inflow channel 10a serving as the inlet for the working fluid should be formed at a predetermined distance from axial discharge channel 10e serving the outlet for working fluid, because the working fluid circulating through passage changing channel 10 should not be mixed with each other. Referring to FIG. 1, axial discharge channel 10e is spaced at 90° from axial inflow channel 10a.

However, a plurality of axial inflow channels 10a may be disposed at less than 90° from a plurality of axial discharge channels 10e, depending on the specification of inflow/discharge performance of solenoid valve 1.

The forces exerted when solenoid valve 1 in operation balance with each other, which advantageously operates for linear control. This is because an electromagnetic force Fm of plunger 5 against a spring force Fs of coil spring 6 pushing plunger 5 toward valve seat 8 maintains balance with respect to the hydraulic pressure Fp caused by the difference in hydraulic pressure inside the valve, as shown in the cross-sectional view taken along line A-A of FIG. 1.

The operation and application of an embodiment the invention will be described hereafter in detail with reference to the accompanying drawings.

According to the embodiment of the invention, when oil that is a working fluid flows into and is discharged out of solenoid valve 1 inserted in valve insert hole Pa of the pump housing case P included in an oil pump, that is, after the working fluid flows in from inlet port PI of pump housing block P circumferentially formed on solenoid valve 1, a discharge passage in which the working fluid flows through solenoid valve 1 and returns to outlet port PO of pump housing case P is formed and the passage is changed into an axial channel in order to facilitate linear control for solenoid valve 1 while the working fluid flows.

As shown in FIG. 1, passage changing channel 10 formed in solenoid valve 1 coupled to pump housing case P is configured, such that when working fluid flows in solenoid valve 1 from the wheel cylinder through inlet port PI of pump housing case P and filter 12, it axially flows inside from the side through axial inflow channel 10a of passage changing channel 10, along channel forming end 4c of valve body 4 to the side, and then the working fluid that has flowed in valve body 4 is discharged to the side through axial discharge channel 10e formed at a predetermined distance from axial inflow channel 10a.

Figure 4:
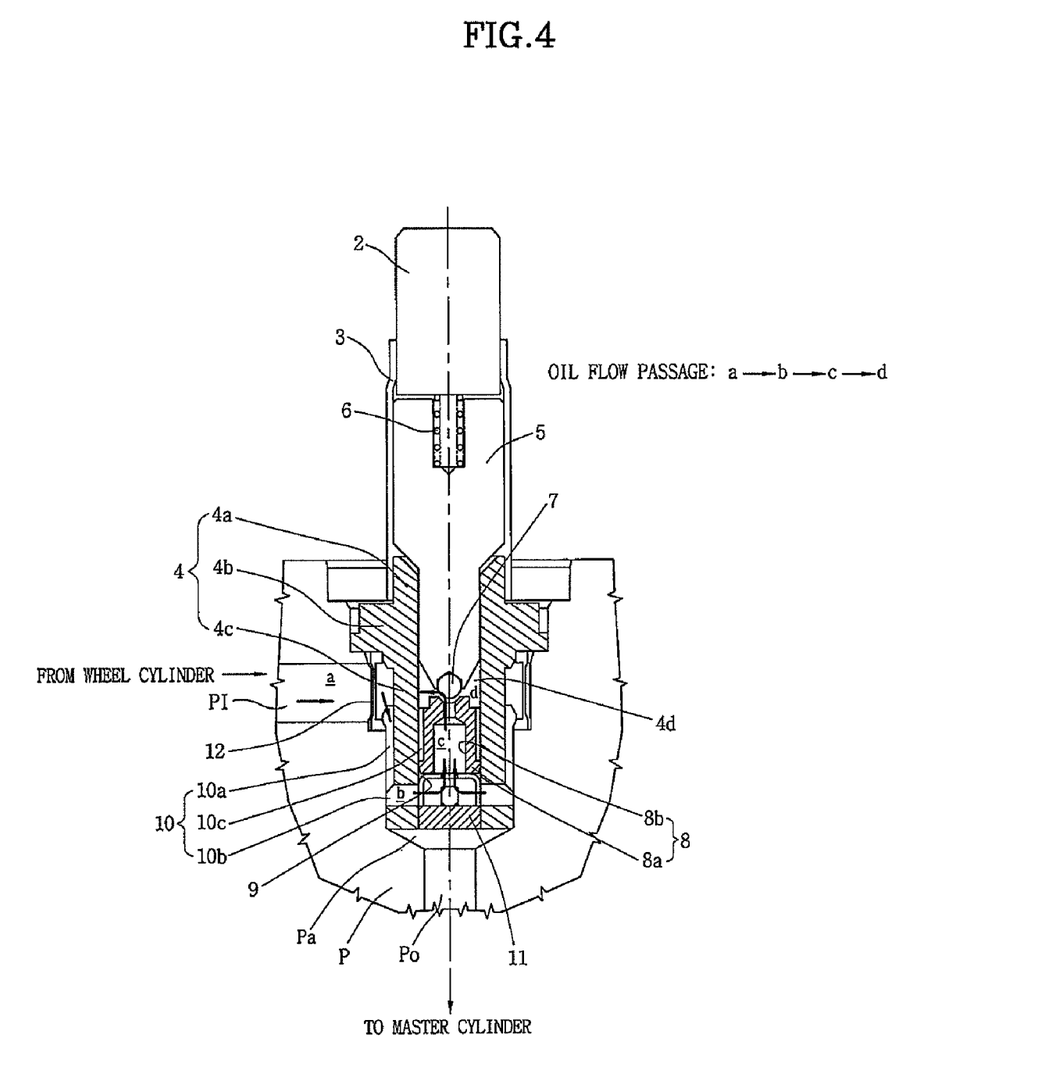
FIG. 4 is a view illustrating a channel in which the working fluid flowing into the side inlet-typed solenoid valve flows into the front of a plunger according to an embodiment of the invention.

Oil circulation passages a, b, c, d, e, f, and g between pump housing case P and solenoid valve 1 will be described in detail. When working fluid flows into solenoid valve 1 through inlet port PI of pump housing case P, as shown in FIG. 4, the working fluid that has passed through inlet port PI of pump housing case P (passage a) flows to channel forming end 4c of the valve body 4 while filtering impurities using filter 12.

Thereafter, the working fluid flows to the side along axial inflow channel 10a of passage changing channel 10 formed on a circumferential surface of channel forming end 4c of valve body 4 and then flows into circumferential communicating channel 10b communicated with body forming channel 4d perpendicular to the end of axial inflow channel 10a (passage b).

The working fluid that has flowed in circumferential communicating channel 10b (passage b) flows into body forming channel 8b of valve seat 8 fitted in body forming channel 4d of valve body 4 (passage c) after passing through orifice 9, and then flows into body forming channel 4d of valve body 4 from open body forming channel 8b of valve seat 8 that is spaced apart from check ball 7 by movement of plunger 5 (passage d).

As a result, the working fluid that has flowed in solenoid valve 1 in pump housing case P from the wheel cylinder flows along the passages configured by the side of solenoid valve 1 (passage a), the circumferential direction (passage b), the axial direction toward the front of plunger 5 (passage c), and body forming channel 4d of valve body 4 where the working fluid is stored in solenoid valve 1 (passage d) in this order.

The operation of solenoid valve 1 into which working fluid flows as described above is embodied, similar to common solenoid valves, such that plunger 5 is pulled against elastic force of coil spring 6 due to excitation of stator 2 by current while check ball 7 between valve seat 8 and plunger 5 is pushed by pressure of the working fluid through valve seat 8, which consequently opens the flow passage between valve seat 8 and plunger 5.

As shown in FIG. 2 that is a cross-sectional view taken along line A-A of FIG. 1, the relationship of the forces exerting in solenoid valve 1 depends on the interaction of hydraulic pressure Fp caused by the hydraulic difference in the valve with spring force Fs of coil spring 6 pushing plunger 5 against valve seat 8 and electromagnetic force Fm of plunger 5 against spring force Fs. Therefore, the linear pressure may be efficiently controlled in order to control PWM of solenoid valve 1 is facilitated because hydraulic pressure Fp caused by the hydraulic difference is generated by working fluid flowing axially in respect to the plunger 5.

The working fluid stored in body forming channel 4d of valve body 4 after flowing into solenoid valve 1 is discharged through passage changing channel 10. Passage changing channel 10 changes the flow direction of the working fluid to a reverse direction to the inflow direction through valve seat 8 and then discharges the working fluid to outlet port PO of pump housing case P from solenoid valve 1.

Figure 5:
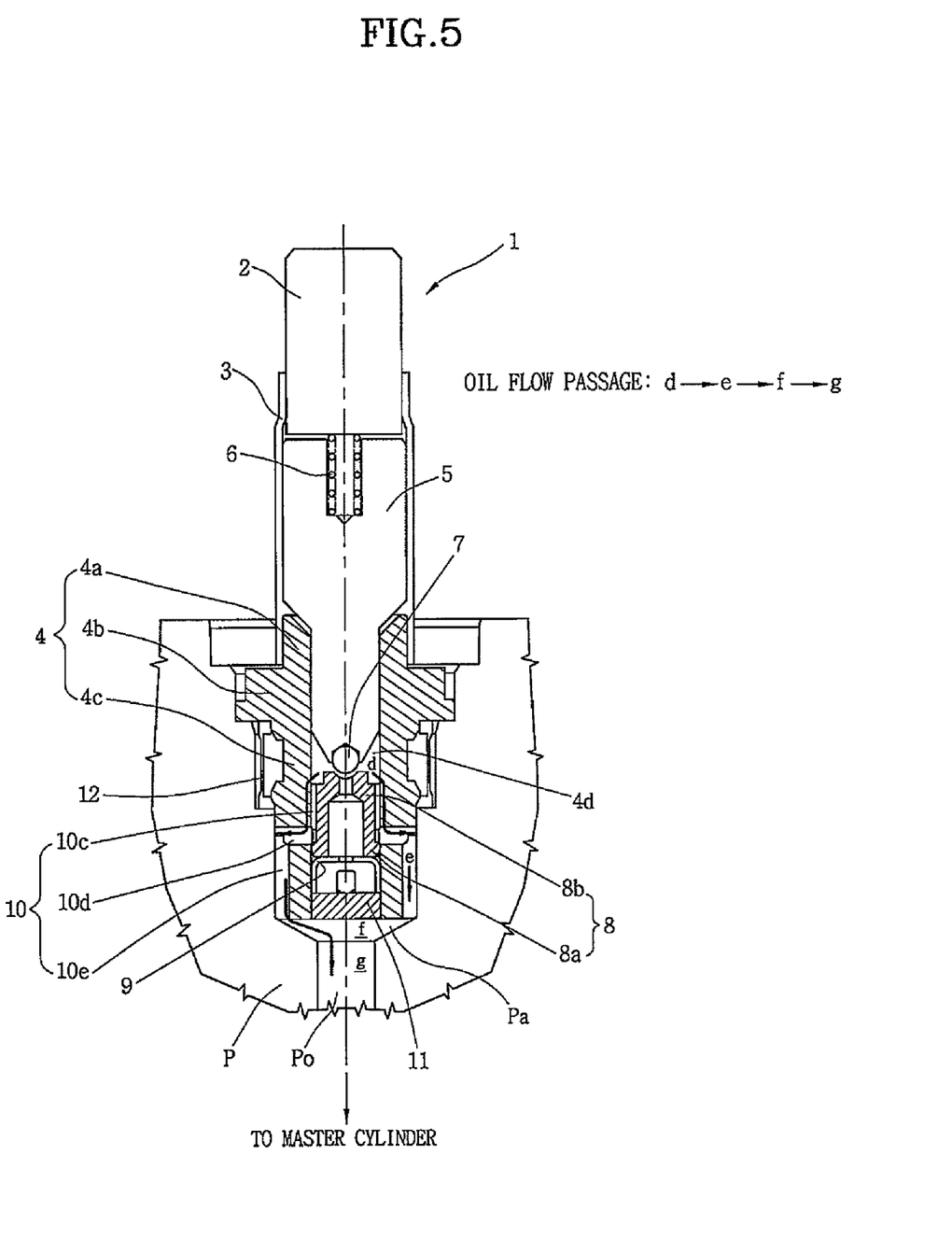
FIG. 5 is a view illustrating a channel for discharging working fluid out of the side inlet-typed solenoid valve according to the invention.

The working fluid that has flowed in solenoid valve 1 is discharged in the reverse direction to the inflow direction, because, as shown in FIG. 5, axial reverse channel 10c that is the discharge passage of passage changing channel 10 is formed in the gap between body forming channel 4d of valve body 4 and the stepped circumferential surface of seat body 8a of valve seat 8. Therefore, the working fluid flows into body forming channel 8b of valve seat 8 and then reverses to the inflow through axial reverse channel 10c formed around the outside of valve seat 8 in discharging.

Then, when the working fluid flows out to circumferential communicating channel 10d circumferentially communicated with the end of axial reverse channel 10c, the working fluid flows into axial discharge channel 10e communicated with circumferential communicating channel 10d disposed at a predetermined distance from axial inflow channel 10a on the circumferential surface of channel forming end 4c of valve body 4 (passage e).

The working fluid that (e) has flowed to axial discharge channel 10e (passage e) is discharged to pump housing block P with solenoid valve 1 connected, that is, flows into the space between valve insert hole Pa of pump housing case P and channel forming end 4c of valve body 4 (passage f).

The working fluid that has been completely discharged out of solenoid valve 1 through valve insert hole Pa flows to outlet port PO connected to valve insert hole Pa (passage g) and then returns to the master cylinder.

Therefore, the working fluid that has flowed in solenoid valve 1 is discharged sequentially along an axial direction and a circumferential direction in valve body 4 of solenoid valve 1 in which the working fluid is stored, an axial direction of valve body 4 in valve body 4 (passage e), and the space at the end of valve insert hole Pa of pump housing block P and outlet port PO communicated therewith (passages f and g).

Figure 6:
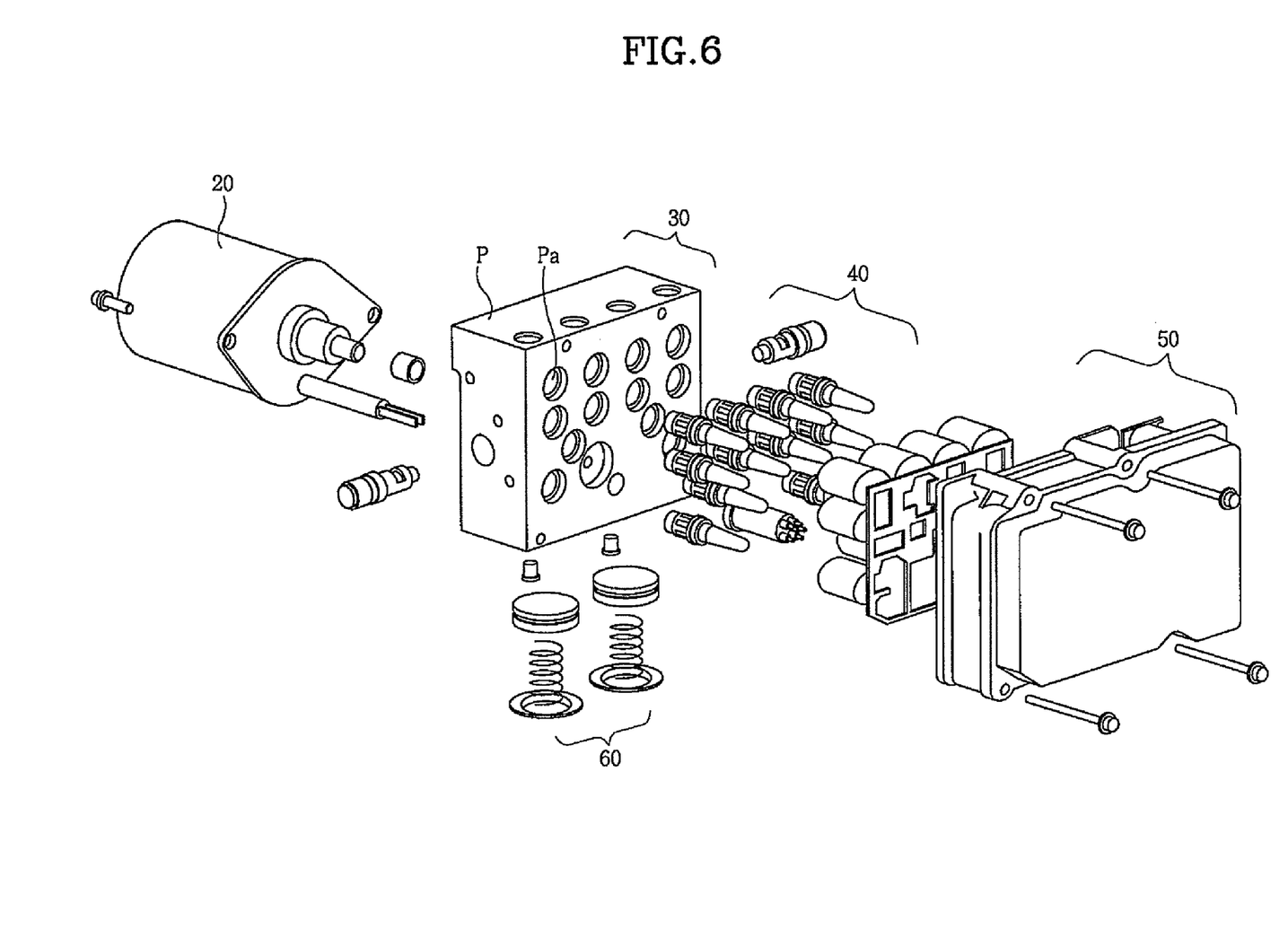
FIG. 6 is a view of the side inlet-typed solenoid valve according to the invention that is applied to an HECU (Hydraulic Electrical Control Unit) for an ABS (Anti-Lock Brake System).

Solenoid valve 1 having a passage for working fluid that is changed into an axial direction and the circumferential direction can be applied in various ways. In particular, as shown in FIG. 6, it is possible to accurately control solenoid valve 1 when using an HECU (Hydraulic Electric Control Unit) that generates an rotational driving force using motor ass'y 20, pumps and circulates oil along the inside channel using a control valve ass'y 40 while actuating pump housing block 30 by motor ass'y 20, temporarily stores the circulating working fluid in an accumulator ass'y 60 at the bottom of pump housing block 30, and controls a break hydraulic pressure for the vehicle while controlling the above parts using a control ass'y 50.

When an HECU including solenoid valve 1 according to the embodiment of the invention is used in an ABS (Anti-Lock Brake System) that electronically controls braking pressure for a vehicle, TCS (Traction Control System), or ESP (Electronic Stability Program), since working fluid flows to the front of the plunger, it is easy to control the linear pressure for the solenoid valve, which allows accurate control of PWM (Pulse Width Modulation) of the solenoid valve.

For example, when an ABS is provided with an HECU including the pump housing block 30 with solenoid valve 1, solenoid valve 1 is inserted in valve insert hole Pa of pump housing P of pump housing block 30 and provides return passage for braking pressure of the working fluid from the wheel cylinder to the master cylinder.

When the working fluid returns from the wheel cylinder to the master cylinder in braking, the flow passages for the working fluid a, b, c, d, e, f, and g that are formed in solenoid valve 1 are as follows. As shown in FIG. 4, the working fluid flowing from pump housing case P (passage a) flows into from the side of solenoid valve 1 along the axial side in the circumferential direction (passage b), and then the working fluid changes the direction into the axial direction (passage c), and axially flows to the front of plunger 5 (passage d).

Further, the discharge passages of the working fluid that has flowed to the front of plunger 5 of solenoid valve 1 are shown in FIG. 5. The discharge passages are configured such that the working fluid axially flows reversely to the axial inflow toward plunger 5 in valve body 4, circumferentially flows, is changed into an axial direction along the side of valve body 4 (passage e), and is axially discharged out through valve insert hole Pa and outlet port PO of pump housing case P (passages f and g).

As described above, when returning from the wheel cylinder to the master cylinder, since the working fluid flows to the front of the plunger inside valve body 4 of solenoid valve 1, it is possible to efficiently control the linear pressure for solenoid valve 1, and thus to accurately control PWM.

According to the invention as described above, since the passage is changed into an axial direction such that the working fluid such as oil having flowed in the solenoid valve flows in the front of the plunger inside the solenoid valve, it is possible to efficiently control the linear pressure for the working fluid flowing into/out of the solenoid valve. Further it is possible to reduce the size of the associated parts as well as the valve because it is possible to change the channel using only the solenoid valve without additionally forming a channel in the pump housing.

Further, when the solenoid valve of the invention is applied to an ABS (Anti-Lock Brake System) that electronically controls braking pressure for a vehicle, TCS (Traction Control System), or ESP (Electronic Stability Program) etc., since the channel is formed toward the front of the plunger to allow easy linear pressure control of the working fluid inside the solenoid valve, it is possible to improve the operational reliability of the ABS, TCS, or ESP and achieve accurate PWM (Pulse Width Modulation) control of the solenoid valve.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A side inlet-typed solenoid valve comprising:
a plunger that is elastically supported by a coil spring and a stator that is magnetized by a coil electromagnetic field caused by current applied, and reciprocates by being magnetized together with the stator to open/close an inside channel;
a valve body that is connected to the stator through a sleeve and inserted in a valve insert hole communicating with an inlet port and an outlet port of a pump housing case such that a flow passage is formed between the inlet port and the outlet port by the plunger that reciprocates therein;
a valve seat that opens/closes the inside channel depending on contact with a check ball provided at the end of the plunger inserted in the valve body;
a passage changing channel that is formed in the valve body so that oil that has flowed in the valve body through the inlet port at the side of the pump housing case flows along the side of the valve body, flows in toward the front of the plunger inserted in a body forming channel in a reverse direction to the inflow, and is then discharged out through the outlet port formed in the axial direction of the valve body;
an orifice that is formed toward the valve seat and fixed in the valve body by a cover to change the direction of the oil flowing in the valve body through the passage changing channel into an axial direction that is the front of the plunger; and
a filter that filters impurities contained in the oil flowing into, at the inlet port of the pump housing case.

2. The solenoid valve as defined in claim 1, wherein the valve body includes:
a pump connecting end having a large diameter that is fitted in the valve insert hole of the pump housing case, an extending connecting end positioned outside the valve insert hole at the rear side of the pump connecting end to which the plunger with the check ball is inserted, and a channel forming end that forms a channel forming end providing an oil storage space for the valve insert hole at the front side of the pump connecting end,
a body forming channel that is axially formed to insert the valve seat and the plunger in the valve body from the left and right, respectively, with the check ball therebetween, and
the passage changing channel that is communicated with the body forming channel at the channel forming end and changes the direction of the oil that has flowed in the valve body to the front of the plunger.

3. The solenoid valve as defined in claim 1, wherein the valve seat has a seat body that forms a predetermined gap in the valve body and provides the passage changing channel that allows the oil having flowed in toward the front of the plunger in the valve body to flow out of the valve body in a reverse direction except for a diametric portion that is closely fitted in the valve body, and
a body forming channel through which the oil flows is formed axially through the seat body and is opened/closed by the check ball.

4. The solenoid valve as defined in claim 3, wherein the diameter of the seat body is constant throughout the entire body with a flow passage for working fluid that is provided by axially forming a groove of a predetermined length on the outside of the seat body, separated from the body forming channel.

5. The solenoid valve as defined in claim 1, wherein the passage changing channel includes axial inflow channels that are formed on the circumferential surface of the end of the valve body positioned at the end of the valve insert hole of the pump housing case,
a circumferential communicating channel that is circumferentially formed inside the valve body and perpendicularly communicated with the end of the axial inflow channel,
a body forming channel of the valve seat that guides the oil having passed through the circumferential communicating channel to the front of the plunger,
an axial reverse channel that is a predetermined gap formed between the outside of the valve seat and the inside of the valve body with the valve body inserted,
a circumferential communicating channel that is formed through around the valve body perpendicular to the end of the axial reverse channel, and
axial discharge channels that is formed on the circumferential surface of the end of the valve body at the connecting portion of the circumferential communicating channel and positioned at a predetermined distance from the axial inflow channel.

6. The solenoid valve as defined in claim 5, wherein the orifice and the valve seat are sequentially positioned in the valve body at the end at which the axial inflow channels and the axial discharge channels are formed.

7. The solenoid valve as defined in claim 5, wherein the axial inflow channels are positioned at predetermined intervals on the inside from the end within the end of the valve body and the axial discharge channels are formed to the end of the valve body.

8. The solenoid valve as defined in claim 7, wherein the axial inflow channel and the axial discharge channel are grooves axially formed around the outside of the end of the valve body.

9. The solenoid valve as defined in claim 8, wherein the axial inflow channels and the axial discharge channels are formed at a plurality of positions.

10. The solenoid valve as defined in claim 9, wherein the axial inflow channel and the axial discharge channel are positioned at 90 from each other.

11. The solenoid valve as defined in claim 5, wherein the orifice is positioned in a position where the circumferential communicating channel is formed.

12. The solenoid valve as defined in claim 11, wherein the orifice has a hole for axial flow and a side hole that helps the working fluid flowing into through the passage changing channel.

13. The solenoid valve as defined in claim 6, wherein the axial inflow channels are positioned at predetermined intervals on the inside from the end within the end of the valve body and the axial discharge channels are formed to the end of the valve body.

14. The solenoid valve as defined in claim 13, wherein the axial inflow channel and the axial discharge channel are grooves axially formed around the outside of the end of the valve body.

* * * * *